Patented Feb. 18, 1941

2,232,581

UNITED STATES PATENT OFFICE 2,232,581

HYDRAULIC FLUID

John C. Woodhouse, Cragmere, and Arthur G. Weber, Wilmington, Del., assignors to E. I. du Pont de Nemours & Company, Wilmington, Del., a corporation of Delaware No Drawing. Application July 15, 1939, Serial No. 284,706

9 Claims. (Cl. 252—76)

This invention relates to hydraulic fluids and more particularly to hydraulic fluids which are inactive and non-corrosive in contact with metal and rubber.

Various proposals have been made to use mixtures of alcohol and castor oil, glycerine, glycols, and the like, for the hydraulic transmission of power such as for actuating the pressure operated elements of hydraulic brake systems and similarly operated apparatus. Numerous disadvantages have, however, characterized these mixtures and solutions such as dangerous possibilities in connection with brake systems due to changes in viscosity, and tendencies toward gasification and solidification under higher and lower temperature conditions, respectively, all of these and similar disadvantages having been drawbacks to commercial utilization of previously proposed fluids.

In addition, it has been found that such mixtures of materials often have a corrosive or decomposing effect upon the rubber and metal parts with which the fluids come in contact. This is particularly true in hydraulic brakes, and in hydraulic clutch systems, where the fluid is subjected to agitation and considerable pressure or both, and where either in normal operation, or by accident, there is also contact with water and air under environmental conditions favoring corrosion.

It is an object of the present invention to overcome these and other undesirable characteristics and particularly to produce a hydraulic fluid which is relatively, if not wholly, inert in contact with rubber and metal parts.

Other objects and advantages of this invention will be apparent by reference to the following specification in which its preferred details and embodiments are described.

We have discovered that liquid mixtures of one or more polyhydric alcohols, one or more polyhydric alcohol ricinoleates, one or more monohydric alcohols, small amounts of soaps and relatively small quantities of an alkaline earth or alkali metal nitrite form particularly suitable fluids for use in hydraulically operated mechanisms. Various proportions of these materials may be used without deleterious effect upon either the rubber or metal parts of hydraulic pressure-operated apparatus, substantially the only requisite being that these materials are present in the fluid mixture in certain rather definite and limited proportions.

We make no explanation of the effect but, although we have found as others have before us that these constituents taken singly often have a highly undesirable effect upon either the rubber or metal parts or both of hydraulic fluid apparatus, nevertheless when these ingredients are combined in a certain definite range of proportions both rubber and metal attack is absent. Various advantages might be claimed for the presence of the mono and polyhydric alcohol constituents in the fluid of this invention, such, for example, as the fact that fluids containing mono- and polyhydric alcohols have a much greater water tolerance than in the absence thereof. However, as pointed out before, we do not necessarily attribute the many advantages of the fluid of this invention to these characteristics and, on the other hand, reiterate that our complete fluid is characterized by such a relatively complete absence of rubber and metal attack as to provide a highly successful and commercially desirable fluid.

Polyhydric alcohols generally have been found efficacious as constituents of the present invention, if used within certain definite proportions to the other ingredients, including such polyhydric alcohols as glycerine, ethylene, propylene, butylene, and isobutylene glycols. In like manner we have found that in the proportions hereinafter set forth we may utilize monohydric alcohols such as methyl, ethyl, propyl, butyl, isobutyl, and higher monohydric alcohols. Polyhydric alcohol ricinoleates generally may be employed according to the present invention, including such mono or diricinoleates as ethylene, propylene, and isobutylene glycol ricinoleates, glycerine ricinoleates, and the like. We have found calcium nitrate to be the preferred nitrite ingredient of our fluid although we have also found that the alkali and alkaline earth metal nitrites generally are efficacious such as sodium, potassium, barium and strontium nitrites and, together with the other ingredients of our fluid, they combine to produce a medium which, as relates to corrosion, is relatively if not wholly inert in contact with rubber and metallic parts.

Although there appears to be a range of proportions within which the individual constituents of our complete fluid may be utilized, nevertheless we have found that this range is definite and limited. Thus, it has been found that the polyhydric alcohol ricinoleates, including such ricinoleates as have been previously described, should be present in our complete fluid in a range of from 5 to 60% by volume. Similarly the polyhydric alcohols should be present in a range of from 3 to 50% by volume, the monohydric alcohols should be present in a range of from 10 to 80% by volume and for each gallon of complete fluid there should be present from 0.5 to 76 grams of an alkali or alkaline earth metal nitrite such as calcium nitrite. Within this range of materials we have found even more preferred compositions exhibiting to a high degree the many requisites desired in a hydraulic fluid including absence of metal and rubber attack, are obtained if the ricinoleates, such as described in our U. S. Patent 2,102,825, are limited to a range between 10 and 40% by volume, the polyhydric alcohols to a range of from 4 to 35% by volume, the monohydric alcohols are restricted to a range of from 40 to 65% by volume, the soaps from 10 to 110 grams and the nitrite maintained in a range of from 5 to 20 grams per gallon of complete fluid.

Although the constituents of our invention have been described somewhat in detail as to separate and individual compounds which may be utilized, specific compositions which we have found to be particularly advantageous hydraulic fluids, possessing characteristics such as absence of metal and rubber attack, and absence of gasification or solidification at high and low temperatures, respectively, are outlined in the following examples:

*Example 1*

Propylene glycol ricinoleate
  parts by volume__ 35.5
Proplyene glycol_____do____ 4.5
Isobutanol _____do____ 60.0
Sodium nitrite per gallon_____grams__ 9
Potassium soap per gallon_____do____ 71

*Example 2*

Ethylene glycol ricinoleate
  parts by volume__ 32.7
Ethylene glycol_____do____ 7.3
Isobutanol_____do____ 60.0
Calcium nitrite per gallon_____grams__ 19
Potassium soap per gallon_____do____ 103

*Example 3*

Glyceryl ricinoleate_____parts by volume__ 10.0
Propylene glycol_____do____ 35.0
Butanol_____do____ 55.0
Potassium nitrite_____grams__ 12

*Example 4*

Ethylene glycol ricinoleate
  parts by volume__ 27.3
Ethylene glycol_____do____ 6.0
Normal butanol_____do____ 66.7
Calcium nitrite per gallon_____grams__ 19
Potassium soap per gallon_____do____ 83

The foregoing examples are simply illustrative of specific compositions which may be produced according to the present invention and the ingredients disclosed as well as the relative ratio between ingredients, may be varied as hereinbefore pointed out without departing from our invention or sacrificing any of the advantages thereof.

We claim:

1. A hydraulic fluid characterized by relatively complete inertness in contact with metallic and rubber parts which comprises a liquid mixture of a polyhydric alcohol, a polyhydric alcohol ricinoleate, an aliphatic monohydric alcohol, and a relatively small quantity of a nitrite selected from the group consisting of alkali and alkaline earth metal nitrites.

2. A hydraulic fluid characterized by relatively complete inertness in contact with metallic and rubber parts which comprises a liquid mixture of a polyhydric alcohol, a polyhydric alcohol ricinoleate, an aliphatic monohydric alcohol, a soap, and a relatively small quantity of a nitrite selected from the group consisting of alkali and alkaline earth metal nitrites.

3. A hydraulic fluid characterized by relatively complete inertness in contact with metallic and rubber parts which comprises a liquid mixture of a polyhydric alcohol, a polyhydric alcohol ricinoleate, an aliphatic monohydric alcohol, and a relatively small quantity of calcium nitrite.

4. A hydraulic fluid characterized by relatively complete inertness in contact with metals or rubber which comprises a liquid mixture of approximately 5–60 parts by volume of a polyhydric alcohol ricinoleate, 3–50 parts polyhydric alcohol, 10–80 parts aliphatic monohydric alcohol, 4 to 150 grams soap and 0.5 to 76 grams nitrite selected from the group consisting of alkali and alkaline earth metal nitrites per gallon of complete hydraulic fluid.

5. A hydraulic fluid characterized by relatively complete inertness in contact with metals and rubber which comprises a liquid mixture of 5–60 parts by volume ethylene glycol ricinoleate, 3–50 parts ethylene glycol, 10–80 parts isobutanol, 4–150 grams potassium ricinoleate and 0.5 to 76 grams calcium nitrite per gallon of complete fluid.

6. A hydraulic fluid characterized by relatively complete inertness in contact with metals and rubber which comprises a liquid mixture of 10–40 parts by volume polyhydric alcohol ricinoleate, 4–35 parts polyhydric alcohol, 40–65 parts aliphatic monohydric alcohol, 10 to 110 grams soap and 5 to 20 grams of nitrite selected from the group consisting of alkali and alkaline earth metal nitrites per gallon of complete fluid.

7. A hydraulic fluid characterized by a relatively complete inertness in contact with metals and rubber which comprises a liquid mixture of approximately 10–40 parts by volume of ethylene glycol ricinoleate, 4–35 parts ethylene glycol, 40–65 parts isobutanol, 10–110 grams potassium ricinoleate and 5–20 grams calcium nitrite per gallon of complete fluid.

8. A hydraulic fluid characterized by a relatively complete inertness in contact with metals and rubber which comprises a liquid mixture of about 27 parts by volume of a polyhydric alcohol ricinoleate, 6 parts of a polyhydric alcohol, 66 parts of an aliphatic monohydric alcohol and 19 grams of nitrite selected from the group consisting of alkali and alkaline earth metal nitrites per gallon of complete hydraulic fluid.

9. A hydraulic fluid characterized by a relatively complete inertness in contact with metals and rubber which comprises a liquid mixture of about 27 parts by volume of ethylene glycol ricinoleate, 6 parts by volume of ethylene glycol, 66 parts by volume of isobutanol, and 19 grams of calcium nitrite per gallon of complete hydraulic fluid.

JOHN C. WOODHOUSE.
     ARTHUR G. WEBER.

CERTIFICATE OF CORRECTION.

Patent No. 2,232,581. February 18, 1941.

JOHN C. WOODHOUSE, ET AL.

It is hereby certified that error appears in the printed specification of the above numbered patent requiring correction as follows: Page 1, second column, line 36, for the word "nitrate" read --nitrite--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.